(12) United States Patent
Landvik

(10) Patent No.: US 12,545,190 B2
(45) Date of Patent: Feb. 10, 2026

(54) STEP ARRANGEMENT FOR A VEHICLE

(71) Applicant: Volvo Truck Corporation, Gothenburg (SE)

(72) Inventor: Sondre Landvik, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 265 days.

(21) Appl. No.: 18/505,259

(22) Filed: Nov. 9, 2023

(65) Prior Publication Data

US 2024/0174180 A1    May 30, 2024

(30) Foreign Application Priority Data

Nov. 30, 2022  (EP) .................................... 22210629

(51) Int. Cl.
*B60R 3/02*    (2006.01)

(52) U.S. Cl.
CPC ..................................... *B60R 3/02* (2013.01)

(58) Field of Classification Search
CPC ....................................................... B60R 3/02
See application file for complete search history.

(56) References Cited

U.S. PATENT DOCUMENTS

| | | | |
|---|---|---|---|
| 4,053,172 A | 10/1977 | McClure | |
| 4,874,197 A * | 10/1989 | Grable | ...................... B60P 3/32 280/166 |
| 5,046,582 A * | 9/1991 | Albrecht | ................... B60R 3/02 182/127 |
| 5,799,962 A * | 9/1998 | Barnhart | ................... B60R 3/02 182/127 |
| 5,957,237 A | 9/1999 | Tigner | |

(Continued)

FOREIGN PATENT DOCUMENTS

| | | |
|---|---|---|
| CN | 203186229 U | 9/2013 |
| CN | 212473285 U | 2/2021 |

(Continued)

OTHER PUBLICATIONS

Partial European Search Report for European Patent Application No. 22210629.6, mailed May 25, 2023, 13 pages.

(Continued)

*Primary Examiner* — Jeffrey J Restifo
(74) *Attorney, Agent, or Firm* — Withrow & Terranova, PLLC

(57) ABSTRACT

A step arrangement comprises a frame, an upper step, a lower step, and a linking element. The upper step is, relative to the connected frame, pivotable around a first geometrical axis to allow the upper step to be moved from a folded position in a storage state of the step arrangement to an unfolded position, the lower step following the movement of the upper step. The linking element, interconnecting the upper and lower steps, is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in in-use state of the step arrangement.

12 Claims, 4 Drawing Sheets

(56) References Cited

U.S. PATENT DOCUMENTS

| | | | |
|---|---|---|---|
| 5,996,737 A * | 12/1999 | Hedley | E02F 9/0833 |
| | | | 182/86 |
| 8,186,763 B2 * | 5/2012 | Kramer | E01C 23/088 |
| | | | 182/127 |
| 8,931,792 B1 * | 1/2015 | Klassen | B60R 3/02 |
| | | | 182/67.4 |
| 9,487,148 B2 * | 11/2016 | Kichline, Jr. | B60R 3/02 |
| 10,183,623 B2 * | 1/2019 | Krishnan | B60R 3/02 |
| 10,486,790 B2 * | 11/2019 | Steindl | B64C 1/24 |
| 10,814,790 B2 * | 10/2020 | Meszaros | B60R 3/02 |
| 11,840,197 B2 * | 12/2023 | Niemela | B60R 11/06 |
| 12,319,234 B2 * | 6/2025 | Niemela | B60R 11/06 |
| 2014/0327223 A1 | 11/2014 | Dilts et al. | |
| 2024/0174180 A1 * | 5/2024 | Landvik | B60R 3/02 |
| 2025/0058713 A1 * | 2/2025 | Hayes | B60R 3/02 |

FOREIGN PATENT DOCUMENTS

| | | |
|---|---|---|
| CN | 214836050 U | 11/2021 |
| CN | 215590617 U | 1/2022 |
| RU | 192935 U1 | 10/2019 |

OTHER PUBLICATIONS

Extended European Search Report for European Patent Application No. 22210629.6, mailed Sep. 4, 2023, 11 pages.

* cited by examiner

STEP ARRANGEMENT FOR A VEHICLE

PRIORITY APPLICATIONS

The present application claims priority to European Patent Application No. 22210629.6, filed on Nov. 30, 2022, and entitled "STEP ARRANGEMENT FOR A VEHICLE," which is incorporated herein by reference in its entirety.

TECHNICAL FIELD

The disclosure relates generally to a step arrangement. In particular aspects, the disclosure relates to a step arrangement for a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

On tractor trucks, some type of step arrangement is normally provided so as to enable the driver to get up to the rear deck and attach cables and hoses to a connected trailer. On for example a diesel truck, the diesel tank may be provided with cut-outs which form steps. This works well as the fluid will fill the available space inside the tank despite the presence of the cut-outs. On BEV (battery electric vehicle) trucks, however, providing such cut-outs are less favourable. On BEVs it is desirable to provide much space for batteries to achieve a good driving range. Although it is conceivable to make steps in the form of cut-outs in the battery volumes, this is disadvantageous for several reasons. One reason is that it is difficult to design the battery cells around such cut-outs. Another reason is that a cut on one battery pack would, in practice, often mean a cut on all packs since each pack is very expensive to develop. A further reason is shorter driving range due to the smaller size of the battery packs.

To allow for a good volume for batteries, foldable steps may be a convenient option. For instance, there are vehicle having two steps, one above the other, and both can be folded out individually. However, due to this type of step design the crash protection structure designed to protect the high-voltage battery packs in side collision scenarios gets a penalty in its ability to protect the battery. Therefore, concepts with only one step have been looked into.

With one step, however, ergonomics becomes an issue, especially for relatively short persons. Even for the average driver, it is not a comfortable ingress/egress from the rear deck which is an area the driver accesses each time a trailer is connected/disconnected.

SUMMARY

According to a first aspect of the disclosure, there is provided a step arrangement for a vehicle, comprising:
 a frame,
 an upper step movably connected to the frame,
 a lower step, and
 a linking element which movably connects the lower step to the upper step,
 wherein the step arrangement is switchable between an in-use state, allowing a user to stand on the lower and upper steps, and a storage state,
 wherein the upper step is, relative to the frame, pivotable around a first geometrical axis to allow the upper step to be moved from a folded position in the storage state of the step arrangement to an unfolded position, the lower step following the movement of the upper step from the folded position to the unfolded position,
 wherein the linking element is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in the in-use state of the step arrangement. The first aspect of the disclosure may seek to provide a step arrangement which provides ergonomic accessibility to the driver while still allowing for good crash protection for a structure next to the step arrangement. A technical benefit may include that the step arrangement uses the smaller vertical space of a "one step solution", while at the same time giving the ergonomic benefits of having two steps. The step arrangement provides a compact solution which gives more space for structural reinforcements for a crash protection structure, while still providing two stepping planes for the driver to get up to, for example, a rear deck area.

It should be understood that although the step arrangement of the present disclosure is particularly advantageous for BEV trucks, the step arrangement may advantageously be implemented on other types of trucks and other types of heavy-duty vehicles, and even on medium or light-duty vehicles.

In some examples, said linking element is a first linking element, the step arrangement further comprising a second linking element which movably connects the lower step to the upper step, wherein the second linking element is, relative to the upper step, pivotable around a third geometrical axis which extends in parallel with the second geometrical axis. A technical benefit may include that having at least two linking elements which are pivotable around parallel geometrical axes provides a more robust configuration, such as resulting in improved stability and strength of the step arrangement.

In some examples, the step arrangement further comprises a third linking element and fourth linking element which movably connect the lower step to the upper step, wherein the third linking element is, relative to the upper step, pivotable around the same second geometrical axis as the first linking element, wherein the fourth linking element is, relative to the upper step, pivotable around the same third geometrical axis as the second linking element. Similarly to above, a technical benefit may include that having at least four linking elements which are pivotable around two parallel geometrical axes provides a more robust configuration, such as resulting in improved stability and strength of the step arrangement.

In some examples, the lower step has four connection points adjacent a respective corner of the lower step, wherein each one of said connection points of the lower step rotatingly engages a respective one of said linking elements. A technical benefit may include that a large stepping area is free for a user to step on, since the placement of the connection points reduces the risk of any obstruction caused by the linking elements.

In some examples, the upper step has four connection points adjacent a respective corner of the upper step, each one of said connection points of the upper step rotatingly engaging a respective one of said linking elements. A technical benefit may include that this allows the lower step to be aligned underneath the upper step in the in-use state of the step arrangement. Hereby, the step arrangement does not need to occupy too much outwardly lateral space in the in-use state. In particular, providing the linking elements so that they extend from a respective corner of the upper step to a corresponding corner of the lower step, allows for a relatively compact in-use state, in which the lower state does not project laterally of the upper step.

In some examples, the frame comprises:
an outward side which, when the step arrangement is mounted to a vehicle is intended to face away from the vehicle,
an opposite inward side intended to face and be connected to a part of the vehicle,
a bottom end intended to be closest to the ground when mounted to a vehicle, and
a top end intended to be furthest from the ground, the top end being defined as located upwardly of the bottom end.

In some examples, each one of the upper step and the lower step has a top surface for stepping with a user's foot when the step arrangement is in said in-use state, wherein in said storage state of the step arrangement the top surfaces of both the upper step and lower step face in the same direction as the inward side of the frame, and when the upper step has been pivoted to its unfolded position, the top surfaces of both the upper and lower steps face upwardly. A technical benefit may include that in said storage state, the step arrangement does not occupy much space in the lateral direction. In this disclosure lateral direction is to be understood as being a direction which runs along, or in parallel with, a pitch axis of a vehicle.

In some examples, in said storage state as well as in said in-use state of the step arrangement, the first geometrical axis extends in parallel with the main direction of extension of the top end of the frame and with the main direction of extension of the bottom end of the frame. This means that the upper plate, may be pivoted such that, in the storage state, the main plane of the upper step extends in parallel with, or in the same plane as, the main plane of the frame. A technical benefit may include that, in the storage state, the upper step adds very little to the total lateral extension of the step arrangement.

In some examples, said first geometrical axis is located adjacent the bottom end of the frame, such that when the step arrangement is changed from its storage state to its in-use state the upper step is unfolded downwardly, whereas when the step arrangement is changed from its in-use state to its storage state, the upper step if folded upwardly. Similarly to above, a technical benefit may include that, the upper step adds very little to the lateral extension of the step arrangement. Furthermore, it may be easier to provide adequate structural support to the upper step for carrying the weight of a person in said in-use state, compared to if said first geometrical axis would be placed at the top end of the frame. A further support for carrying the weight of the person may, for example, be provided by a support mechanism for the upper step, such as extending wires, sliding rods, lever arms, bump stops, etc.

In some examples, in said storage state of the step arrangement, the second geometrical axis extends upwardly and in parallel with the inward side and outward side of the frame, whereas in said in-use state of the step arrangement, the second geometrical axis extends perpendicularly to the inward side and outward side of the frame. A technical benefit may include that, due to the changeable direction of extension of the second geometrical axis, a compact step arrangement is achievable, in both the storage state and the in-use state.

In some examples, in said in-use state of the step arrangement, the upper step is located upwardly of and in parallel with the lower step such that a respective central point of the upper and lower steps can be traversed by a common imaginary line drawn perpendicularly to the top surfaces of the upper and lower steps. A technical benefit may include that the step arrangement is compact in the in-use state and does not take up too much space in the lateral direction. For instance, in some examples, the centre of mass of the upper step may suitably be vertically aligned with the centre of mass of the lower step in said in-use state.

In some examples, in said storage state of the step arrangement the upper step is in its folded position and is circumferentially surrounded by the frame. A technical benefit may include that this provides a compact step arrangement in the storage state since the upper step may substantially fit within the perimeters of the frame, protruding very little from the frame in the lateral direction or not at all.

In some examples, the upper step may be locked in position in said storage state by means of a locking mechanism. Thereby, the step arrangement can be secured while driving the vehicle. Similarly, in some examples, the lower step may be locked in position in said storage state by the same or by a different locking mechanism.

In some examples, in said storage state of the step arrangement, the lower step overlaps with and projects beyond the frame and the upper step. A technical benefit may include that the overlap in combination with the second geometrical axis extending substantially perpendicularly to the first geometrical axis allows, the lower step to be at substantially the same vertical level as the upper step in the storage state of the step arrangement, while still allowing the lower step to swing down to the in-use state of the step arrangement where it can be aligned underneath the upper step. Thus, a compact step arrangement is achieved and the frame can be unaffected by the extension of the lower step, allowing for adequate crash protection. By only having the upper step within the frame, less space is taken up in the vertical direction, thus increasing the possibility to have proper continuous bars for crash protection of for example batteries.

In some examples, in said storage state of the step arrangement, a portion of the lower step projects beyond the frame and the upper step as seen in the rearward direction of the vehicle. In some examples, in said storage state of the step arrangement, a portion of the lower step projects beyond the frame and the upper step as seen in the forward direction of the vehicle.

According to a second aspect of the disclosure, there is provided a vehicle comprising a crash protection structure for batteries and a step arrangement according to the first aspect, including any example thereof, wherein the frame of the step arrangement is mounted on the crash protection structure. Technical benefits may largely include those discussed above in relation to the step arrangement of the first aspect, including any example thereof.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Figure 1:
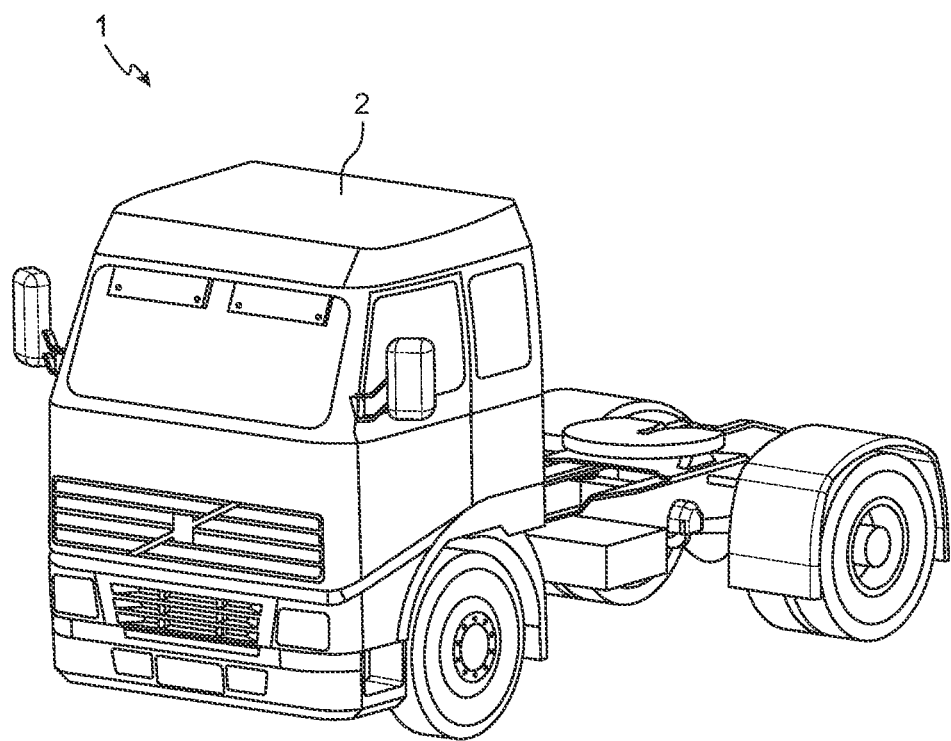
FIG. 1 illustrates a vehicle according to at least one example.

Aspects set forth below represent the necessary information to enable those skilled in the art to practice the disclosure.

As discussed above with reference to the background of this disclosure, different types of step arrangements come with different potential drawbacks, such as limiting the space available for batteries, reduced crash protection for the batteries, and/or reduced ergonomics.

By providing a step arrangement which comprises a frame to which an upper step is movably connected, and a lower step which in its turn is movable connected to the upper step by linking elements a compact step arrangement may be achieved while still allowing for appropriate spatial availability of other structures such as batteries, and allowing for adequate crash protection and satisfactory ergonomics. In particular a compact step arrangement is achieved by allowing the relative movement between the upper step and the frame, in comparison to the relative movement between the lower step and the upper step, to take place around different geometrical axes. Hereby, a fully functional and ergonomically solution is available in an in-use state of the step arrangement, while in the folded storage position of the step arrangement a compact solution is provided which is beneficial to both spatial availability and the robustness from a crash-protection perspective.

In the following, like reference numerals refer to like elements throughout the description.

FIG. 1 illustrates a vehicle 1 according to at least one example. In this example, the vehicle 1 is a heavy-duty vehicle in the form of a tractor unit. The tractor unit may be powered by an electric battery, i.e., the vehicle 1 may thus be a battery electric vehicle (BEV). Alternatively, the vehicle may be powered by a fuel cell system, in which case the vehicle 1 may be a fuel cell electric vehicle (FCEV). A step arrangement in accordance with this disclosure may suitably be implemented for either a BEV or an FCEV. However, it should be understood, that the step arrangement may be mounted on other types of heavy-duty vehicles as well, such as a vehicle powered by an internal combustion engine (ICE). Furthermore, it should be understood that although a tractor unit has been illustrated, the teachings of the present disclosure may also be implemented in other types of vehicles, such as busses, construction equipment, recreational vehicles, road work vehicles, boats, campers, etc. The illustrated vehicle 1 comprises a cabin 2 in which a driver may operate the vehicle 1. However, in other exemplary embodiments the vehicle 1 may be an autonomous, i.e., self-driving, vehicle.

Figure 2:
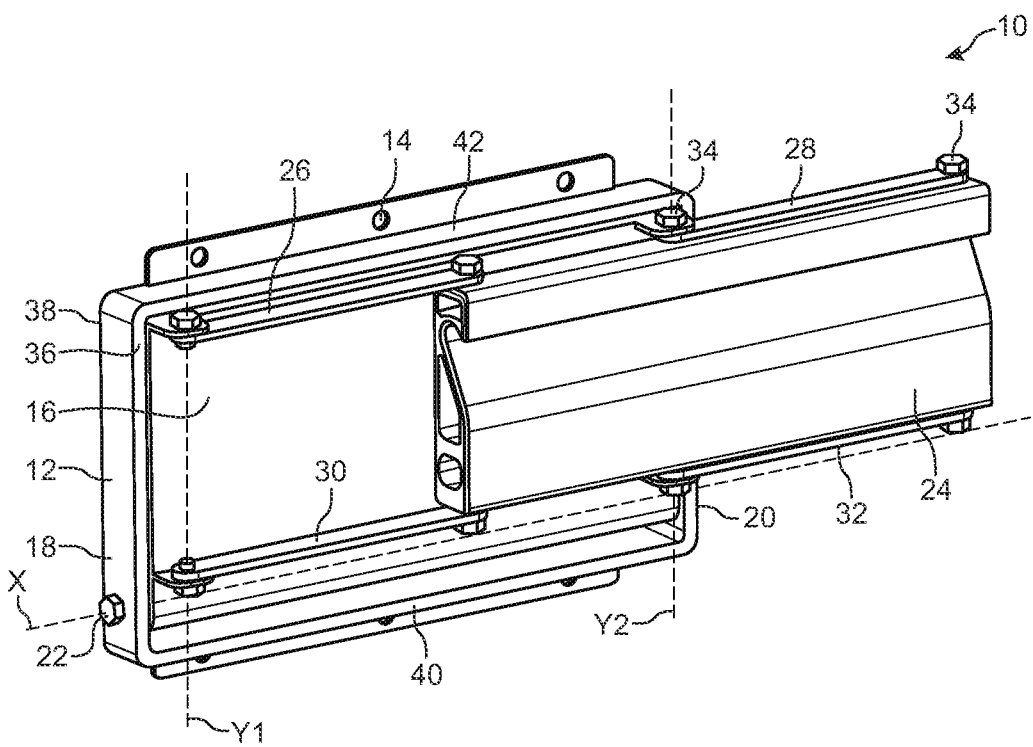
FIGS. 2-4 illustrate a step arrangement for a vehicle according to at least one example.
Figure 3:
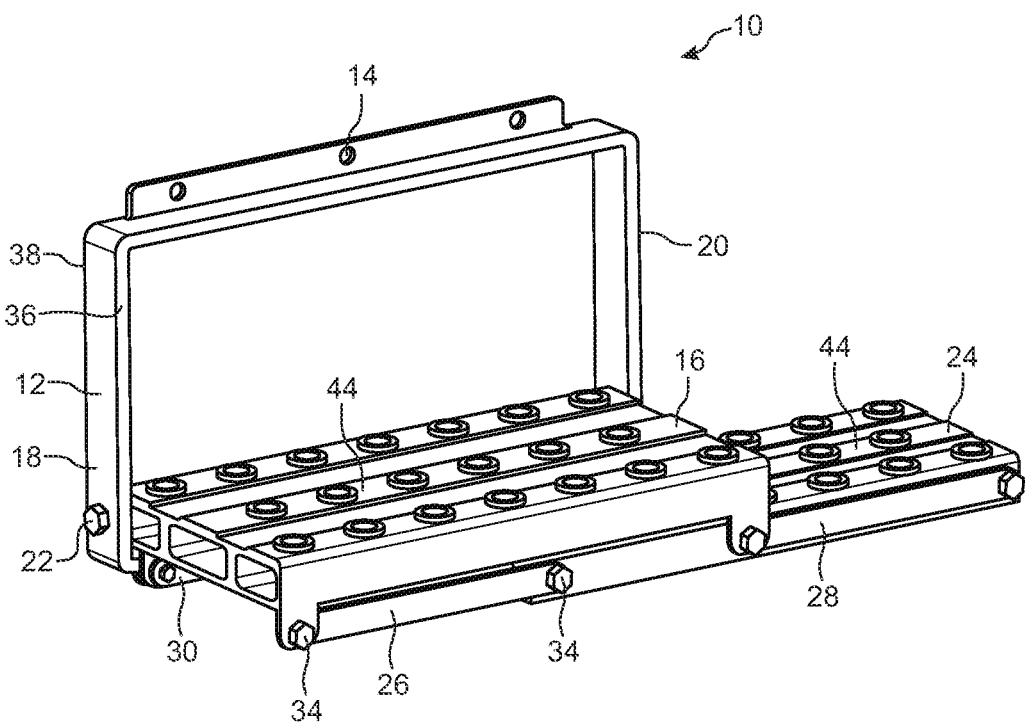
Figure 4:
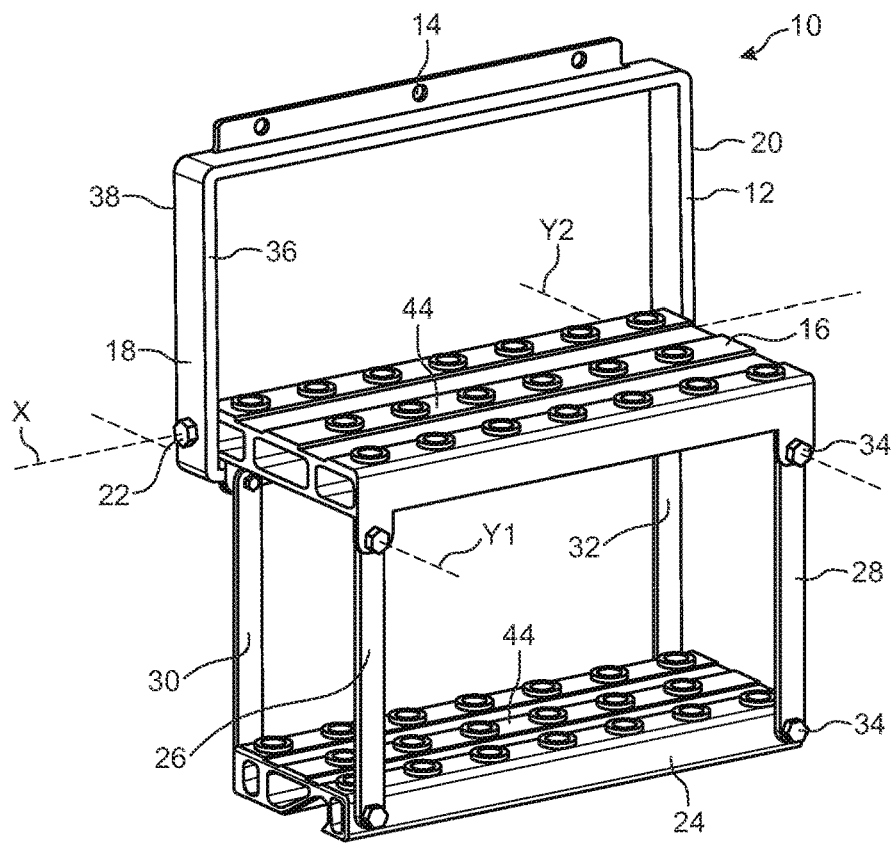

FIGS. 2-4 illustrate a step arrangement 10 for a vehicle, such as the vehicle 1 in FIG. 1, in accordance with at least one example.

FIG. 2 illustrates a storage state of the step arrangement 10. Thus, when the step arrangement 10 is not in use, it will normally be in the illustrated storage state, i.e., in its most folded state. For example, during transportation, when the vehicle travels along a road, the step arrangement 10 will normally be in this storage state of FIG. 2.

FIG. 4 illustrates an in-use state of the step arrangement 10. Thus, when a person wishes to climb the step arrangement 10, the step arrangement 10 will be switched to this in-use state, i.e., its most unfolded state.

FIG. 3 illustrates a transitional state, through which the step arrangement 10 passes when it is switched from the storage state of FIG. 2 to the in-use state of FIG. 4, or vice versa.

As illustrated in FIGS. 2-4, the step arrangement 10 comprises a frame 12. The frame 12 may be mounted by appropriate fasteners to another structure of the vehicle. For instance, the frame 12, may be provided with one or more brackets provided with holes 14 for receiving such fasteners. A non-limiting example of such another structure of the vehicle is a crash-protection structure, which will be discussed in connection with FIGS. 5-6. It should, however, be understood, that the frame 12 may be mounted to any other appropriate structure depending on the configuration of the vehicle, and/or depending on where it is desirable to facilitate climbing access to the vehicle.

The step arrangement 10 further comprises an upper step 16 movably connected to the frame 12. The relative movement of the upper step 16 may be achieved in various different ways. For instance, the upper step 16 may have parts through which a bar extends. The upper step 16 may, for example, be configured to pivot around such a bar extending from a first end 18 of the frame 12 through said parts of the upper step 16, and to an opposite second end 20 of the frame 12. However, other engagements are also conceivable, such as short studs or first engagement elements extending from either side 18, 20 of the frame 12, which engage with mating second engagement elements of the upper step 16, wherein the mutual engagement between the first and second engagement elements allow for movement of the upper step 16 relative to the frame 12. As illustrated in FIGS. 2-4, a bolt 22 is indicated as extending through the frame 12. The bolt 22 may suitably also extend through a part of the upper step 16, such as a flange part or similar, and be tightened by a nut on the other side of said part of the upper step 16. Suitably, a corresponding bolt/nut engagement may be provided at the opposite end 20 of the frame 12. Such a bolt/nut arrangement may thus provide for yet another conceivable way of creating a movable connection between the upper step 16 and the frame 12.

The step arrangement further comprises a lower step 24. At least one linking element 26 movably connects the lower step to the upper step. In this example, as best seen in FIG. 4, there are four linking elements 26, 28, 30, 32. Furthermore, as illustrated in FIGS. 2-4 each linking element 26, 28, 30, 32 may at its two ends connected to the upper frame 16 and lower frame 24, respectively, such as by means of a bolt/nut connection. Each linking element 26, 28, 30, 32 may in such case pivot around the shaft of the bolt of the bolt/nut connection. For instance, the shaft may have a threaded portion engaging the nut, and a non-threaded portion for enabling smooth pivoting of the linking element 26, 28, 30, 32 around the shaft.

By these connections between the upper step 16 and the frame 12, and between the lower step 24 and the upper step 16, the step arrangement 10 is switchable between an in-use state (FIG. 4), allowing a user to stand on the lower step 24 and the upper step 16, and a storage state (FIG. 2).

In accordance with this disclosure, the pivoting movements of the upper step 16 and lower step 24 are pivotable around different geometrical axes. More specifically, the upper step 16 may, relative to the frame, be pivotable around a first geometric axis X to allow the upper step 16 to be moved from a folded position in said storage state (FIG. 2) to and unfolded position. As can be seen from FIG. 3 and FIG. 4, the upper step 16 has the same unfolded position in both the transitional state (FIG. 3) and the in-use state (FIG. 4) of the step arrangement 10. Thus, when the upper step 16 has been unfolded to switch from the storage state (FIG. 2) to the transitional state (FIG. 3) of the step arrangement 10, the upper step 16 will remain as it when the switching is continued to the in-use state (FIG. 4) of the step arrangement 10.

As can be seen in FIGS. 2 and 3, the lower step 24 may follow the movement of the upper step 16 from said folded position to said unfolded position. In other words, the lower step 24, may suitably follow the movement of the upper step 16 when switching between the storage state (FIG. 2) and the transitional state (FIG. 3) of the step arrangement 10.

A first linking element 26 may, relative to the upper step, be pivotable around a second geometrical axis Y1 which extends in a direction which is substantially perpendicular to the direction of extension of the first geometrical axis X. With reference to FIGS. 3 and 4, this allows the lower step 24 to be moved along an arc of a geometrical circle so that the lower step 24 becomes spaced apart from the upper step 16 in a completely unfolded position of the lower step 24 in said in-use state of the step arrangement 10. To make an analogy, in the transitional state of the step arrangement (FIG. 3), the lower step 24 can be regarded as being positioned at 3 o'clock, and when the step arrangement 10 is switched to the in-use state (FIG. 4), then the lower step 24 follows the clock down to 6 o'clock. In the illustrated example, the linking elements 26, 28, 30, 32 make a 90° pivoting motion when the step arrangement 10 is switched between the transitional state (FIG. 3) and the in-use state (FIG. 4). Similarly, in this example, the upper step 16 has previously made a 90° pivoting motion when the step arrangement 10 was switched from the storage state (FIG. 2) to the transitional state (FIG. 3).

As mentioned above, the lower step 24 is moved along an arc of a geometrical circle so that the lower step 24 becomes spaced apart from the upper step 16 in a completely unfolded position of the lower step 24 in said in-use state of the step arrangement 10. The expression "completely unfolded" has been selected so as not to confuse with the movement of the lower step 24 when it follows the unfolding of the upper step 16 (switching from storage state of FIG. 2 to transitional state of FIG. 3). That following movement might be considered to also represent a sort of unfolding movement of the lower step 24, although it is the upper step 16 that is the primary cause of such unfolding.

In this example, there are four linking elements 26, 28, 30, 32 interconnecting the lower step 24 and the upper step 16. In a general sense, the step arrangement 10 may be considered to have a first linking element 26 that is pivotable around said second geometrical axis Y1, and a second linking element 28 which is, relative to the upper step 16, pivotable around a third geometrical axis Y2 which extends in parallel with the second geometrical axis Y1.

Furthermore, since there are four linking elements 26, 28, 30, 32 in this example, the remaining two of the linking elements may be regarded as third and fourth linking elements 30, 32, wherein the third linking element 30 is, relative to the upper step 16, pivotable around the same second geometrical axis Y1 as the first linking element 26, wherein the fourth linking element 32 is, relative to the upper step 16, pivotable around the same third geometrical axis Y2 as the second linking element 28.

As mentioned previously, the linking elements 26, 28, 30, 32 may suitably be connected to the upper step 16 and lower step 24, by means of for example a bolt/nut connection. However, other types of connections are also conceivable. Thus, in a general sense, in at least some examples, the lower step 24 and the upper step 16 may have connection points 34 which rotatingly engages a linking element 26, 28, 30, 32.

As illustrated in FIGS. 2-4, the connection points 34 (such as the exemplified bolt/nut connections) may suitably be provided adjacent a respective corner of the lower step 24, and similarly for the upper step 16. Thus, the lower step 24 may have four connection points 34 adjacent a respective corner of the lower step 24, wherein each one of said connection points 34 of the lower step rotatingly engages a respective one of the linking elements 26, 28, 30, 32. Similarly, the upper step 16 may have four connection points 34 adjacent a respective corner of the upper step 16, wherein each one of the connection points 34 of the upper step 16 rotatingly engages a respective one of the linking elements 26, 28, 30, 32.

It should be readily understood from the drawings how the step arrangement 10 should be oriented relative to the rest of the vehicle. Nevertheless, for completeness, reference may be made to the frame 12 and its mounting to the vehicle. The frame 12 comprises an outward side 36 which, when the step arrangement 10 is mounted to a vehicle is intended to face away from the vehicle. The frame 12 further comprises an opposite inward side 38 intended to face and be connected to a part of the vehicle. The frame 12 further comprises a bottom end 40 and a top end 42 (see FIG. 2). The bottom end 40 is intended to be closest to the ground when mounted to a vehicle, while the top end 42 is intended to be furthest from the ground. The top end 42 will thus be located upwardly of the bottom end 40.

Each one of the upper step 16 and the lower step 24 has a top surface 44 for stepping with a user's foot when the step arrangement 10 is in said in-use state (FIG. 4). The top surface 44 may suitably have an anti-glide function, such as presenting an anti-glide material or having a varying surface structure, such as being provided with protrusions and/or recesses to improve the grip of a user's shoe-sole when stepping onto the top surface 44. As can be seen in FIG. 2, in the storage state of the step arrangement 10, the top surfaces 44 (not visible in FIG. 2) of both the upper step 16 and the lower step 24 face in the same direction as the inward side 38 of the frame 12. However, as can be seen in FIG. 3, when the upper step 16 has been pivoted to its unfolded position (transitional state of the step arrangement 10), the top surfaces 44 of the upper and lower steps 16, 24 face upwardly. Naturally, when the lower step 24 has been moved to its completely unfolded position (in-use state in FIG. 4), the top surfaces 44 still face upwardly.

As can be seen throughout FIGS. 2-4, the first geometrical axis X may extend in parallel with the main direction of extension of the top end 42 of the frame as well as in parallel with the main direction of extension of the bottom end 40 of the frame 12. In particular, the first geometrical axis X may be located adjacent the bottom end 40 of the frame 12, such that when the step arrangement 10 is changed from its storage state (FIG. 2) to its in-use state (FIG. 4), the upper step 16 is unfolded downwardly, whereas when the step arrangement 10 is changed from its in-use state (FIG. 4) to its storage state (FIG. 2), the upper step 16 is folded upwardly.

As can be seen in FIG. 2, in the storage state of the step arrangement 10, the upper step 16, being in its folded position, may be circumferentially surrounded by the frame 12. Thus, the area enclosed by the perimeter of the frame 12, may suitably correspond to, or be slightly larger than, the area of the upper step 16. However, as also illustrated in FIG. 2, in the storage state of the step arrangement 10, the lower step 24 may overlap with and project beyond the frame 12 and beyond the upper step 16.

Continuing with FIG. 2, in the storage state of the step arrangement 10, the second geometrical axis Y may extend upwardly and in parallel with the inward side 38 and outward side 40 of the frame 12. However, as seen in FIG. 4, in the in-use state of the step arrangement 10, the second geometrical axis Y1 may extend perpendicularly to the inward side 38 and the outward side 40 of the frame 12.

As shown in FIG. 4, in the in-use state of the step arrangement 10, the upper step 16 may suitably be located upwardly of and in parallel with the lower step 24 such that a respective central point of the upper step 16 and lower step 24 can be traversed by a common imaginary line drawn perpendicularly to the top surfaces 44 of the upper and lower steps 16, 24. In other words, under normal conditions, in the in-use state, the upper step 16 may suitably be located right above the lower step 24, i.e. without any lateral displacement between the two. As can be understood from the above, in at least some examples, in said in-use state, the respective centre of mass of the upper step 16 and the lower step 24, may be located along a common imaginary line which extends in a direction which is perpendicular to the direction of extension of any one of the first, second and third geometrical axes X, Y1, Y2.

It should be understood that the illustrations in FIGS. 2-4 are just an example, and various modifications may be made. For instance, in at least some other examples, the step arrangement 10 may be provided with a support mechanism for the upper step 16. Such a support mechanism would provide additional support for carrying the load of a person stepping on the step arrangement 10. Some possible examples of support mechanisms may include extending wires, sliding rods or lever arm bump stops on the back side.

Furthermore, it should be understood that although FIGS. 2-4 show a sequence in which the upper step 16 is folded down first before the lower step 24 is moved relative to the upper step 16, the switching from the storage state of FIG. 2 to the in-use state of FIG. 4 could instead be achieved in a different order. For example, you could start by unfolding the lower step 24 relative to the upper step 16, and then unfold the upper step 16 and lower step 24 downwards together. Similarly, switching form the in-use state of FIG. 4 to the storage state of FIG. 2 could either be achieved by starting with moving the lower step 24 relative to the upper step 16 to arrive at the intermediate state of FIG. 3 and then the two steps 16, 24 are folded upwards together, or the upper step 16 could first be folded upwards with the lower step 24 following the motion of the upper step 16, and then afterwards the lower step 16 is completely folded 16 into the position shown in the storage state of FIG. 2.

Figure 5:
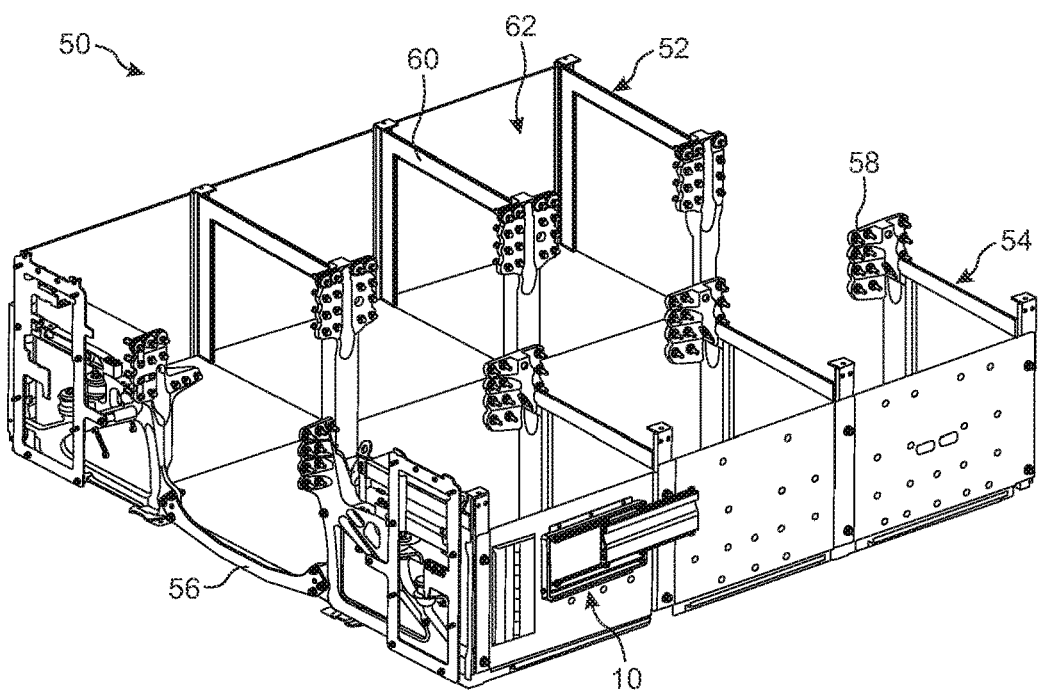
FIGS. 5-6 illustrate the step arrangement of FIG. 2 mounted on a crash protection structure.
Figure 6:
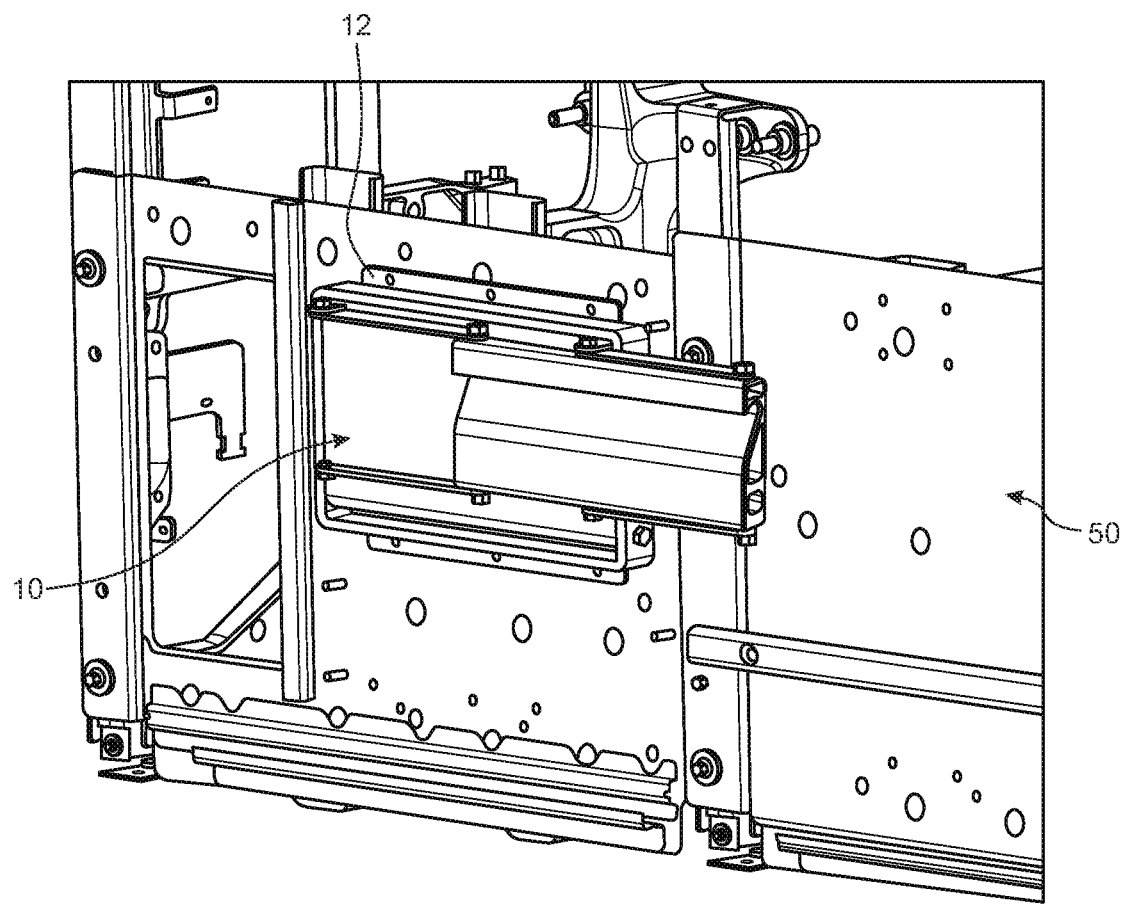

FIGS. 5-6 illustrate the step arrangement 10 of FIG. 2 mounted on a crash protection structure 50.

More specifically. FIG. 5 illustrates schematically a crash protection structure 50 of a modular system for, for instance, an energy storage system (ESS) installation. The crash protection structure 50 is herein illustrated as an open cage structure for receiving energy source modules, such as batteries. In the illustrated example, the crash protection structure is a two-sided structure, having a first part 52 configured to be located on the left side of a vehicle chassis and a second part 54 configured to be located on the right side of the chassis. The first part 52 and the second part 54 are interconnected by connecting elements 56 (only one shown in FIG. 5), which may extend underneath the chassis. Although the connecting elements 56 are configured to extend underneath the chassis, the first and the second parts 52, 54 will be located generally laterally of the chassis, i.e., on respective sides thereof. It should be understood that in other exemplary embodiments, the crash protection structure 50 may have only one part, and does not necessarily need to be connected laterally of the chassis, as other locations may be more appropriate depending on the configuration of the individual vehicle to which a crash protection structure is to be installed. In the illustrated example, the crash protection structure 50 is provided with brackets 58 for attaching the crash protection structure 50 to the chassis. Suitable fastening elements, such as bolts, may be driven through the brackets 58 and the chassis to tighten the crash protection structure 50 to the chassis. As illustrated in FIG. 5, the crash protection structure 50 may be provided with partition portions 60 for dividing the available space into individual compartments 62. This reduces the risk of the energy source modules inadvertently bumping into each other during driving. In the present illustration, there are three compartments 62 on either side, which means that the crash protection structure 50 is prepared for receiving six energy source modules.

As mentioned above, the energy source modules may be in the form of batteries. Thus, the crash protection structure 50 may be a crash protection structure for batteries. Furthermore, such a crash protection structure 50 may thus form part of or be mounted to a vehicle, such as the vehicle 1 in FIG. 1. As illustrated in FIG. 5 and in the close-up view in FIG. 6, the frame 12 of the step arrangement 10 may be mounted to the outside of the crash protection structure 50.

In addition, to what has been discussed above, it should be understood that the step arrangement 10 may suitably be provided with any suitable latch or locking portion, which is configured to prevent the step arrangement 10 from inadvertently switching from the storage state to the in-use state.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises." "comprising." "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A step arrangement for a vehicle, comprising:
   a frame;
   an upper step movably connected to the frame;
   a lower step; and
   a linking element which movably connects the lower step to the upper step;
   wherein the step arrangement is switchable between an in-use state, allowing a user to stand on the lower and upper steps, and a storage state;
   wherein the upper step is, relative to the frame, pivotable around a first geometrical axis to allow the upper step to be moved from a folded position in the storage state of the step arrangement to an unfolded position, the lower step following the movement of the upper step from the folded position to the unfolded position;
   wherein the linking element is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in the in-use state of the step arrangement;
   wherein the linking element is a first linking element, the step arrangement further comprising a second linking element which movably connects the lower step to the upper step; and
   wherein the second linking element is, relative to the upper step, pivotable around a third geometrical axis which extends in parallel with the second geometrical axis.

2. The step arrangement of claim 1, further comprising a third linking element and fourth linking element which movably connect the lower step to the upper step;
   wherein the third linking element is, relative to the upper step, pivotable around the same second geometrical axis as the first linking element; and
   wherein the fourth linking element is, relative to the upper step, pivotable around the same third geometrical axis as the second linking element.

3. The step arrangement of claim 2:
   wherein the lower step has four connection points adjacent a respective corner of the lower step; and
   wherein each one of the connection points of the lower step rotatingly engages a respective one of the linking elements.

4. The step arrangement of claim 2, wherein the upper step has four connection points adjacent a respective corner of the upper step, each one of the connection points of the upper step rotatingly engaging a respective one of the linking elements.

5. The step arrangement of claim 1, wherein in the storage state of the step arrangement, the lower step overlaps with and projects beyond the frame and the upper step.

6. A vehicle comprising a crash protection structure for batteries and the step arrangement of claim 1, wherein the frame of the step arrangement is mounted on the crash protection structure.

7. A step arrangement for a vehicle, comprising:
   a frame comprising:
      an outward side which, when the step arrangement is mounted to a vehicle, is intended to face away from the vehicle;
      an opposite inward side intended to face and be connected to a part of the vehicle;
      a bottom end intended to be closest to the ground when mounted to a vehicle; and
      a top end intended to be furthest from the ground, the top end being defined as located upwardly of the bottom end;
   an upper step movably connected to the frame;
   a lower step; and
   a linking element which movably connects the lower step to the upper step;
   wherein the step arrangement is switchable between an in-use state, allowing a user to stand on the lower and upper steps, and a storage state;
   wherein the upper step is, relative to the frame, pivotable around a first geometrical axis to allow the upper step to be moved from a folded position in the storage state of the step arrangement to an unfolded position, the lower step following the movement of the upper step from the folded position to the unfolded position;
   wherein the linking element is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in the in-use state of the step arrangement;
   wherein each one of the upper step and the lower step has a top surface for stepping with a user's foot when the step arrangement is in the in-use state;
   wherein, in the storage state of the step arrangement, the top surfaces of both the upper step and the lower step face in the same direction as the inward side of the frame; and when the upper step has been pivoted to the unfolded position, the top surfaces of both the upper step and the lower step face upwardly.

8. The step arrangement of claim 7, wherein, in the storage state as well as in the in-use state of the step arrangement, the first geometrical axis extends in parallel with the main direction of extension of the top end of the frame and with the main direction of extension of the bottom end of the frame.

9. The step arrangement of claim 7, wherein the first geometrical axis is located adjacent the bottom end of the frame, such that when the step arrangement is changed from its storage state to its in-use state, the upper step is unfolded downwardly, whereas when the step arrangement is changed from its in-use state to its storage state, the upper step is folded upwardly.

10. The step arrangement of claim 7, wherein, in the storage state of the step arrangement, the second geometrical axis extends upwardly and in parallel with the inward side and outward side of the frame, whereas in the in-use state of the step arrangement, the second geometrical axis extends perpendicularly to the inward side and outward side of the frame.

11. A step arrangement for a vehicle, comprising:
a frame;
an upper step movably connected to the frame;
a lower step; and
a linking element which movably connects the lower step to the upper step;
wherein the step arrangement is switchable between an in-use state, allowing a user to stand on the lower and upper steps, and a storage state;
wherein the upper step is, relative to the frame, pivotable around a first geometrical axis to allow the upper step to be moved from a folded position in the storage state of the step arrangement to an unfolded position, the lower step following the movement of the upper step from the folded position to the unfolded position;
wherein the linking element is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in the in-use state of the step arrangement; and
wherein, in the in-use state of the step arrangement, the upper step is located upwardly of and in parallel with the lower step such that a respective central point of the upper step and the lower step can be traversed by a common imaginary line drawn perpendicularly to top surfaces of the upper step and the lower step.

12. A step arrangement for a vehicle, comprising:
a frame;
an upper step movably connected to the frame;
a lower step; and
a linking element which movably connects the lower step to the upper step;
wherein the step arrangement is switchable between an in-use state, allowing a user to stand on the lower and upper steps, and a storage state;
wherein the upper step is, relative to the frame, pivotable around a first geometrical axis to allow the upper step to be moved from a folded position in the storage state of the step arrangement to an unfolded position, the lower step following the movement of the upper step from the folded position to the unfolded position;
wherein the linking element is, relative to the upper step, pivotable around a second geometrical axis which extends in a direction which is substantially perpendicular to the direction of extension of the first geometrical axis, in order to allow the lower step to be moved along an arc of a geometrical circle so that the lower step becomes spaced apart from the upper step in a completely unfolded position of the lower step in the in-use state of the step arrangement; and
wherein in the storage state of the step arrangement, the upper step is in the folded position and is circumferentially surrounded by the frame.

* * * * *